United States Patent
Lewera et al.

(10) Patent No.: US 12,060,268 B2
(45) Date of Patent: Aug. 13, 2024

(54) PALLADIUM-PLATINUM SYSTEM FOR USE AS HYDROGEN STORAGE MATERIAL AND/OR ELECTROCATALYST, PREFERABLY IN FUEL-CELLS

(71) Applicant: UNIWERSYTET WARSZAWSKI, Warsaw (PL)

(72) Inventors: Adam Lewera, Warsaw (PL); Piotr Polczynski, Grodzisk Mazowiecki (PL); Rafal Jurczakowski, Brwinow (PL)

(73) Assignee: UNIWERSYTET WARSZAWSKI, Warsaw (PL)

( * ) Notice: Subject to any disclaimer, the term of this patent is extended or adjusted under 35 U.S.C. 154(b) by 595 days.

(21) Appl. No.: 17/223,644

(22) Filed: Apr. 6, 2021

(65) Prior Publication Data

US 2021/0292162 A1 Sep. 23, 2021

Related U.S. Application Data

(62) Division of application No. 15/576,488, filed as application No. PCT/EP2015/079028 on Dec. 8, 2015, now abandoned.

(30) Foreign Application Priority Data

May 23, 2015 (PL) .......................... 412436

(51) Int. Cl.
| | |
|---|---|
| *B01J 23/42* | (2006.01) |
| *B01J 23/44* | (2006.01) |
| *B01J 35/33* | (2024.01) |
| *B01J 37/02* | (2006.01) |
| *C01B 3/00* | (2006.01) |

(Continued)

(52) U.S. Cl.
CPC ............ *C01B 3/0084* (2013.01); *B01J 23/42* (2013.01); *B01J 23/44* (2013.01); *B01J 35/33* (2024.01); *B01J 37/0244* (2013.01); *C01B 3/0026* (2013.01); *H01M 4/8657* (2013.01); *H01M 4/92* (2013.01); *H01M 8/0208* (2013.01); *H01M 2008/1095* (2013.01); *Y02E 60/32* (2013.01)

(58) Field of Classification Search
CPC ... B01J 23/42; B01J 23/44; B01J 35/33; B01J 37/0244; C01B 3/0026; C01B 3/0084; H01M 4/8657; H01M 4/92; H01M 8/0208
See application file for complete search history.

(56) References Cited

U.S. PATENT DOCUMENTS 7,855,021 B2 * 12/2010 Adzic ................... H01M 4/921
429/482
7,968,488 B2 * 6/2011 Arps ................... H01M 4/9075
428/548

(Continued)

FOREIGN PATENT DOCUMENTS

WO 2014020541 A1 2/2014

*Primary Examiner* — Cam N. Nguyen
(74) *Attorney, Agent, or Firm* — BROWDY AND NEIMARK, PLLC

(57) ABSTRACT

The present invention relates to palladium-platinum system consisting of palladium layer covered with a platinum overlayer consisting of 1 to 10 platinum monolayers deposited on palladium for use as hydrogen storage. Such system can be used in fuel cells, hydride batteries and supercapacitors. A method for increasing hydrogen absorption kinetics of hydrogen absorption/desorption process is also disclosed.

11 Claims, 11 Drawing Sheets

(51) Int. Cl.
    *H01M 4/86*     (2006.01)
    *H01M 4/92*     (2006.01)
    *H01M 8/0208*     (2016.01)
    *H01M 8/10*     (2016.01)

(56) References Cited

U.S. PATENT DOCUMENTS

| | | | | |
|---|---|---|---|---|
| 8,404,613 | B2* | 3/2013 | Adzic | C23C 28/345 |
| | | | | 977/734 |
| 8,524,364 | B2* | 9/2013 | Arps | C23C 14/0005 |
| | | | | 428/570 |
| 9,005,331 | B2* | 4/2015 | Adzic | B82Y 30/00 |
| | | | | 75/255 |
| 9,034,165 | B2* | 5/2015 | Wang | H01M 4/8657 |
| | | | | 205/264 |
| 9,150,968 | B2* | 10/2015 | Adzic | B01J 35/397 |
| 9,689,085 | B2* | 6/2017 | Wang | C25D 5/18 |
| 2006/0134505 | A1 | 6/2006 | Wang et al. | |
| 2010/0099012 | A1* | 4/2010 | Adzic | H01M 4/92 |
| | | | | 502/313 |
| 2010/0216632 | A1* | 8/2010 | Adzic | H01M 4/8657 |
| | | | | 977/773 |
| 2011/0262837 | A1* | 10/2011 | Arps | H01M 4/8657 |
| | | | | 526/108 |
| 2013/0177838 | A1* | 7/2013 | Wang | B01J 23/468 |
| | | | | 429/525 |
| 2015/0196888 | A1* | 7/2015 | Liu | B01J 37/0225 |
| | | | | 422/186.04 |
| 2017/0309921 | A1* | 10/2017 | Gath | H01M 4/8605 |

* cited by examiner

Fig. 11A
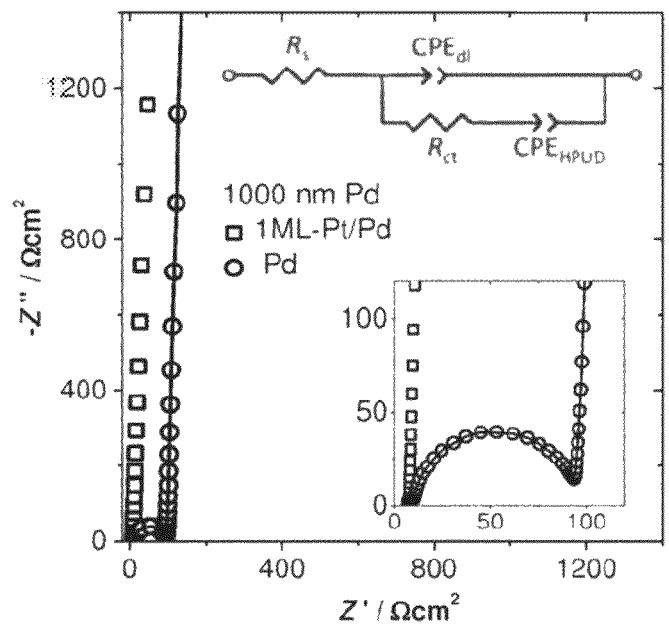
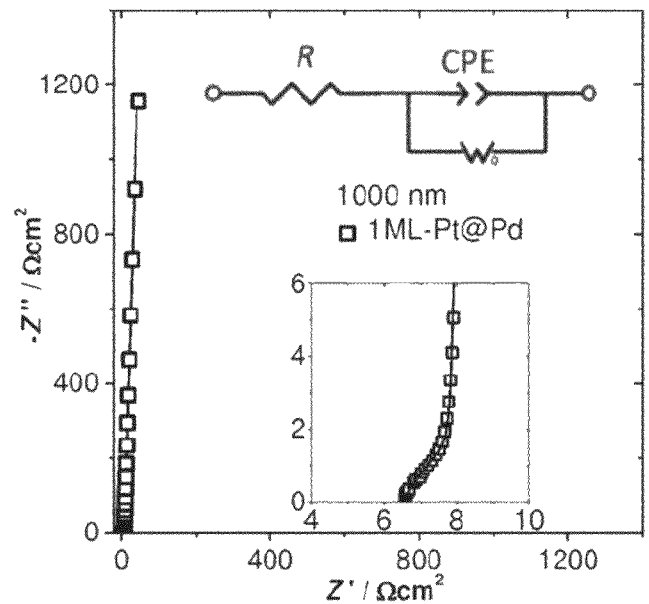
Fig. 11B

PALLADIUM-PLATINUM SYSTEM FOR USE AS HYDROGEN STORAGE MATERIAL AND/OR ELECTROCATALYST, PREFERABLY IN FUEL-CELLS

The present invention relates to a novel palladium-platinum system. Such system is useful as hydrogen storage material and/or electrocatalyst. Such system may be successfully used in fuel-cells.

BACKGROUND OF THE INVENTION

The new sources of energy characterized by high efficiency and environmental friendliness are still one of the main areas of interest. The fuel cell, which converts energy of a chemical reaction into electricity, is an example of such a source that provides numerous benefits over the other traditional sources of electric energy. While the fuel cells are more and more frequently accepted as sources of electric energy, there are still numerous technical obstacles, which hinder their everyday use in many practical applications.

One of such obstacles is that in fuel cells hydrogen is commonly employed as fuel, whereas oxygen is used as an oxidant. Clean hydrogen energy has a great potential as a technology of the future, since it may prevent serious environmental problems related to rapidly growing energy demands. However, hydrogen as simple, clean and efficient fuel is also extremely flammable. Therefore for practical applications voluminous high-pressure vessels are still necessary for storage and transport of hydrogen that in fact make hydrogen-fed fuel cells unsuitable for use. It is important primarily in mobile uses such as the powering of vehicles where it is almost unacceptable to use hydrogen storage medium.

Certain materials and alloys in solid state have the ability to absorb and desorb hydrogen. These materials have been considered as potential hydrogen storage materials, due to their large hydrogen storage capacity. One of such solid-phase storage material is a metal or metal-alloy system that works by absorbing hydrogen through the formation of a metal hydride under specific temperature/pressure or electrochemical conditions, and releasing hydrogen when these conditions are changed, usually upon heating. Metal hydride systems have the advantage of high-density hydrogen storage for long periods of time. Kinetics of metal hydride formation is of paramount importance not only to hydrogen storage, but also in other applications such as sensing and purification. Surface processes are considered to be dominant factors delaying the hydrogen insertion. Noble metals are often listed as good hydrogen storages materials. Among them the fastest hydrogen adsorption occurs at platinum but bulk platinum is impermeable to hydrogen and blocks the absorption. Therefore palladium is more often used in practical applications. Palladium could also be used in combination with other metals. It has been proven to serve as an efficient catalyst to facilitate hydrogen insertion into other metal hydrides (G. Xin, J. Yang, C. Wang, J. Zheng and X. Li, Dalton Trans., 2012, 41, 6783-6790; B. D. Adams and A. C. Chen, *Materials Today*, 2011, 14, 282-289). However, all presently known hydrogen storage materials, including palladium, suffer from slow hydrogen absorption/desorption kinetics. In this context, solid hydrogen storage/transport materials that exhibit good adsorption/desorption kinetics are still desirable.

Moreover, noble metals such as platinum, ruthenium, rhodium, palladium, gold and silver, also supported on an electrically conductive carrier, are widely used in such conventional fuel cells as electrocatalysts.

Likewise platinum or platinum alloys, which are the most efficient among noble metals and therefore commonly used as electrocatalysts, are also used as cathode and anode materials in fuel cells. However, platinum is a rare and expensive material. Therefore a great effort is put into development of new electrocatalyst materials that are cheaper but still exhibit at least the same efficiency.

For example, in publication WO2008093243, it is underlined that in order to lower significantly the concentration of noble metals, such as platinum, without decreasing the activity of the catalyst, it is desirable to develop a method for preparation of electrocatalysts, which improves the chemical homogeneity and dispersivity of the active metal components of the catalysts and, at the same time, ensures an optimal distribution of the catalytically active metals throughout the support particles. Such catalyst could be prepared by heating a suspension of the carbon support in an aqueous solution of $H_2PtCl_6$ and $H_2PdCl_4$ and by subsequently precipitating the metals with a reducing agent. By this method the total amount of noble metals in this catalyst can theoretically be decreased by about 50 to 70 percent.

Use of gas-permeable porous electrodes out of which at least one has the surface comprising titanium covered only by noble metal layer including platinum is another example of a method for decreasing amount of noble metals in fuel cells (GB-913592).

Moreover, as an alternative to the most efficient but also most expensive platinum electrode material, palladium and palladium alloys were proposed. Metallic palladium is commonly employed as a heterogeneous catalyst that is used, in particular, in reduction, hydrogenation and dehydrogenation reactions. For example, in the description of the patent CH344720A a process was disclosed for the preparation of 9a-halo-allopregnan-17a-oyl-3,20-diones, which employed palladium on charcoal as a hydrogenation catalyst. Further, the patent publication US2002004621A presents a process employing palladium adsorbed on a solid substrate as a catalyst for the reaction of removing C10-C16 diolefins by selective hydrogenation. Therefore palladium material would seem natural choice for use as fuel cell electrocatalyst.

For example, WO04026474 discloses a novel palladium catalyst prepared in a three-stage process comprising inter alia thermal high-temperature treatment of palladium on a solid support along with other metals, such as Mg or Al, which are converted into oxides and function as co-catalysts and insulators. Such a catalyst is useful, for example, in hydrogenation reactions, where it exhibits satisfactory selectivity and a long life. The catalyst does not, however, find utility in other reactions commonly catalysed by palladium, and the process for the preparation thereof is time-consuming and expensive.

Another patent document JP2003275593 discloses, in turn, a supported palladium catalyst which could be easily prepared by electrochemical methods. However, this catalyst displays highly desired selectivity only in a hydrogenation reaction.

Another approach, which is less time-consuming, but still failing to provide sufficient efficiency, was presented in patent publication WO2012099583. Said publication discloses an electrochemical system for a fuel cell comprising an anode, cathode and electrolyte located between the electrodes, wherein palladium nanoparticles are provided between the electrolyte and at least one of the electrodes that act also as a catalyst.

Further, the description of WO2012064768 discloses palladium nanotubes or nanowires useful as a catalyst for fuel cells. Similarly, the patent publication CN102698745 discloses a process for preparation of electrodes from titanium nanotubes coated by palladium nanoparticles. However, while use of such catalysts lowers the electrode reaction potential, it provides neither long life of the electrode nor high cell efficiency.

Therefore a lot of research groups are working to develop a novel, platinum-based electrocatalyst material, which could work with similar or even higher efficiency as platinum electrocatalyst, but would lower manufacturing costs in comparison to the traditional cells.

In patent application U.S. Pat. No. 4,490,219 a method of manufacture employing electrochemically dispersed platinum catalysts deposited on a substrate is disclosed. A substrate such as carbon, graphite, or various semiconductors is coated with a "two-dimensional" islands of flat isolated crystallites of platinum, palladium or silver to form a catalyst useful in a fuel cell.

Also mixed, palladium—platinum alloys are widely used in heterogeneous catalysis. As electrocatalysts, metal-coated palladium or palladium-alloy particles, in particular platinum-coated palladium nanoparticles, are known (US2006134505). Such palladium and platinum systems are used not only as a core but also as an outer layer of the electrocatalyst. For example in US2008182745 a method of preparing a carbon-supported platinum/palladium electrocatalyst is described. However, the electrocatalyst obtained by this method does not exhibit sufficient activity due to incomplete homogeneity. Moreover, it is prone to diffusion limitations, which is highly undesirable.

Furthermore, platinum monolayers deposited on palladium have been recognized for their unique catalytic properties towards oxygen reduction reaction (K. P. Gong, Y. Cho, M. B. Vukmirovic, P. Liu, C. Ma, D. Su and R. R. Adzic, *Z Phys Chem*, 2012, 226, 1025-1038; K. P. Gong, J. Park, D. Su and R. R. Adzic, *J Solid State Electr*, 2014, 18, 1171-1179; J. Zhang, F. H. B. Lima, M. H. Shao, K. Sasaki, J. X. Wang, J. Hanson and R. R. Adzic, *The Journal of Physical Chemistry B*, 2005, 109, 22701-22704).

However, none of the above systems exhibited simultaneously all of desired properties nor has been studied with regard to hydrogen absorption. Moreover, none of the known systems has been shown to exhibit all the desired properties and can serve simultaneously as hydrogen storage material and electrocatalyst that also might find application as a fuel cell electrode. Thus, there is still a need for development of hydrogen storage material that would also work as electrocatalyst and preferably be homogenous, highly selective, retaining applicability for a prolonged time with high efficiency and easy to prepare. Furthermore, such a desirable electrocatalyst would serve as an electrode that exhibits high and reversible hydrogen absorption characteristic. All of the above-mentioned problems are crucial, especially for applications in fuel cells.

SUMMARY OF THE INVENTION

The present inventors have conducted a comprehensive survey on Pd covered with Pt overlayers comprising essentially a two-dimensional Pt deposits. Such an essentially two-dimensional deposit refers to a layer of a single atom thickness (i.e. a monolayer, ML) covering Pd surface completely. In some embodiments this layer of a single atom thickness might be, at least, partially covered with the second monolayer. Yet in another embodiment of the invention additional (third) at least partial platinum monolayer is present. A partial platinum monolayer is understood as a layer of a single atom thickness that does not cover the surface completely. Thus the overlayer can comprise more than three platinum ML. For example, the Pt overlayer can consists of 1 to 10 ML, in particular 1, 2, 3, 4, 5, 6, 7, 8, 9 or 10 ML. Moreover, the second and further layers can cover the first Pt ML only partially.

The results obtained by the present inventors have been very surprising. In view of the hydrogen-induced lattice migration (HILM) effect, the dissolution of a single platinum monolayer into the palladium bulk would have been expected in the course hydrogen absorption/desorption (N. Eliaz, D. Eliezer and D. Olson, *Materials Science and Engineering*: A, 2000, 289, 41-53). Since in vacuum palladium has lower surface energy than platinum, this process should be promoted by the surface segregation (K. Yun, Y. H. Cho, P. R. Cha, J. Lee, H. S. Nam, J. S. Oh, J. H. Choi and S. C. Lee, *Acta Mater.*, 2012, 60, 4908-4916; D. Radosavkic, N. Barrett, R. Belkhou, N. Marsot and C. Guillot, *Surface Science*, 2002, 516, 56-68). Contrary to these expectations, the present inventors obtained a system of uniform and essentially two-dimensional coverage of palladium with platinum monolayers, which exhibits unique and desirable properties.

The inventors of the present invention unexpectedly observed that Pt deposited on the palladium surface in the form of a monolayer drastically increases the kinetics of hydrogen sorption, so that the process becomes diffusion limited. The overall content of Pt in the monolayer is of 0.01% by weight order of magnitude in relation to palladium on which it is deposited. Times needed to fully saturate the palladium layers were reduced nearly by two orders of magnitude. Platinum overlayers were characterized by surprisingly high stability even after severe electrochemical treatment involving hundreds of hydrogen absorption/desorption cycles. Bulk properties remaining unaffected by deposited platinum, point out that platinized Pd films combine both, fast adsorption kinetics on platinum with palladium absorption capabilities. Such catalyst is cheap, reversible, highly selective and retains applicability for a prolonged time with high efficiency. Therefore, the present invention provides system, which address all the above-mentioned needs.

Thus the present invention relates the palladium-platinum (Pd/Pt) system consisting of a palladium layer covered with platinum overlayer consisting of 1 to 10, preferably 1 to 3, more preferably at most 2 platinum monolayers (ML), or even more preferably one platinum monolayer, deposited on palladium for use as a hydrogen storage. In one of the embodiments, in the system of the invention the second and subsequent platinum monolayers cover the first platinum layer (i.e. the layer deposited directly on palladium) only partially.

Palladium-platinum system according to the invention is useful also as an electrocatalyst. In the preferred practical applications of the invention such palladium-platinum system is used in fuel cells, hydride batteries a supercapacitors.

In one embodiment of the invention, the palladium of the palladium-platinum system of the invention plays a role of the support for the entire system. In an alternative embodiment of the invention such Pd/Pt system might be deposited on a solid substrate, in particular a less expensive material that is commonly used for such applications. For example, such solid support might be selected from a group comprising carbon, polymer, semiconductor or metallic substrate (WO2014020541). Preferably Pd/Pt system of the invention is deposited on metallic surface, most preferably on gold. In an alternative embodiment the Pd/Pt system of the invention is deposited on AB5, such as MmNi4.1Al0.2Mn0.4Co0.45 alloy, which is a hydrogen storage alloy. AB5 alloys combine a hydride forming metal A, usually a rare earth metal (La, Ce, Nd, Pr, Y or their mixture known as Mischmetal (Mm)), with a non-hydride forming element—nickel. The latter can be doped with other metals, such as Co, Sn or Al, to improve materials stability or to adjust equilibrium hydrogen pressure and temperature required for its charging discharging with hydrogen (see for example: https://www.sigmaaldrich.com/materials-science/material-science-products.html?TablePage=19920387 #sthash.gqQk-JaUu.dpuf). Physicochemical and electrochemical characteristic of MmNi4.1Al0.2Mn0.4Co0.45 alloy is well established (see Karwowska et al., Journal of Power Sources 263 (2014) 304-309)

Such Pd/Pt system could be deposited by any suitable method. Preferably, it is deposited on the substrate by electrochemical method. Such deposition facilitates control of the deposited layer thickness.

In another aspect of the invention a method of increasing hydrogen absorption kinetics of hydrogen absorption/desorption is provided. The method of the invention comprises a step of covering hydrogen storage material with the platinum overlayer consisting of 1 to 10 platinum monolayers, preferably 1 to 3 platinum monolayers, more preferably at most two platinum monolayers. In a particularly preferred embodiment of the method of the invention the platinum overlayer is a two-dimensional platinum overlayer consisting of a single platinum monolayer.

Preferably the hydrogen storage material according to the method of the invention is palladium. Alternatively the hydrogen storage material is AB5. AB5 alloy, such as MmNi4.1Al0.2Mn0.4Co0.45 alloy, covered with a two-dimensional platinum overlayer is particularly useful as the hydrogen storage material.

BRIEF DESCRIPTION OF FIGURES

FIGS. 11A and 11B present impedance spectra at $E=0.170$V vs. RHE for pure Pd (FIG. 11A) and 1ML-Pt/Pd (FIG. 11B); continuous lines represent the fitting results: $T_{dl}=20.4\pm0.7$ $uFs^{\varphi-1}$ $cm^{-2}$, $(dl=0.943\pm0.002$, $R_{ct}=84.3\pm0.7$ $\Omega cm^2$, $T_{HUPD}=3.70\pm0.02$ $mFs^{\varphi-1}cm^{-2}$, $\varphi_{HUPD}=0.924\pm0.002$ (FIG. 11A); $T_{CPE}=2.58\pm0.02$ $mFs^{\varphi-1}$ $cm^{-2}$, $\varphi_{CPE}=0.93\pm0.01$, W-R=$5.4\pm0.1$ $\Omega cm^2$, W-T=$(5.7\pm0.1)\times10^{-2}$ s, W-$\varphi$=0.5 (FIG. 11B).

EXPERIMENTAL

All palladium films of thickness between 50-1000 nm were deposited on a polycrystalline Au electrode according to under potential deposition (UPD) procedure described by Szpak et al. (S. Szpak, P. A. Mosierboss, S. R. Scharber and J. J. Smith, Journal of Electroanalytical Chemistry, 1992, 337, 147-163). Measurements were carried out in 0.1M HC104 at 25±0.01° C. in two compartment electrochemical cell. A counter electrode was a large Pd sheet (~10 $cm^2$), the reference electrode was Hg|$Hg_2SO_4$|0.1M $H_2SO_4$ with the potential of 0.721 V vs. RHE. All potentials are reported against the RHE. Pt overlayers were obtained by Cu displacement method as described in details by S. Brankovic et al. (S. Brankovic, J. Wang and R. Adžić, Surface Science, 2001, 474, L173-L179). Pd electrode covered with Cu monolayer deposited from 0.1M $H_2SO_4$+1 mM $CuSO_4$ was transferred to 0.01M $K_2PtCl_6$ solution without exposure to air. Pt overlayers ranging from 1 to 10 ML were obtained by repeating this procedure. Spontaneous deposition (without Cu-UPD layers) was also performed. For this purpose Pd sample was immersed into 0.1M $K_2PtCl_4$ solution. Next, the electrode was thoroughly rinsed with deionized water and polarized cathodically in acidic environment. N 6.7 Ar gas (Air Products, BIP-PLUS) was used for solution deaeration. All glassware was cleaned with sulfochromic acid and subsequently with concentrated sulfuric acid and with deionised water in a final step.

Figure 1:
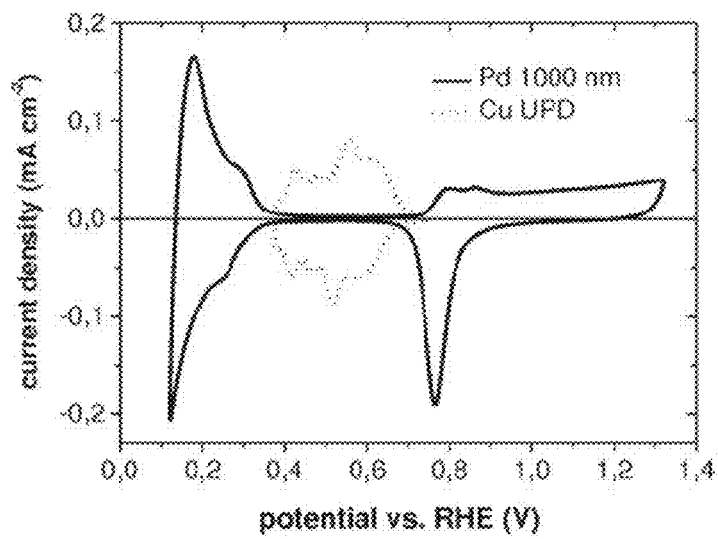
FIG. 1 presents cyclic voltammogram recorded for 1000 nm Pd in pure 0.1 M $HClO_4$ (solid line) and in the presence of 1 mM $CuSO_4$ (dotted line), scan rate 20 $mV \times s^{-1}$.

Cyclic voltammograms for palladium limited volume electrode (1000 nm in thickness) recorded in a perchloric acid solution are presented on FIG. 1. The system's purity is confirmed by both the presence of the adsorption peaks at 0.27 V and by high symmetry of currents in the double layer region. The oxide formation/reduction region is typical for palladium electrode in acidic environments (H. Duncan and A. Lasia, *Electrochimica Acta*, 2008, 53, 6845-6850; C. Gabrielli, P. P. Grand, A. Lasia and H. Perrot, *Journal of the Electrochemical Society*, 2004, 151, A1937-A1942; A. Czerwinski, I. Kiersztyn, M. Grden and J. Czapla, Journal of Electroanalytical Chemistry, 1999, 471, 190-195; M. Lukaszewski, M. Grden and A. Czerwinski, *Journal of New Materials for Electrochemical Systems*, 2006, 9, 409-417). The hydrogen region is asymmetrical due to kinetic hindrance, which is particularly visible when the cathodic limit is set to more negative potentials where the beta phase is formed (the dashed curve on FIG. 2). Initially, the influence of platinum on hydrogen sorption was studied for Pt/Pd layers obtained by spontaneous deposition (SD). Pt surface coverage was estimated from the position of the Pd—Pt oxides reduction peak as described in by Grden et al (M. Grden, A. Piascik, Z. Koczorowski and A. Czerwinski, *Journal of Electroanalytical Chemistry*, 2002, 532, 35-42). After a single SD run, the surface Pt coverage was established to be about 15% of fully packed Pt monolayer. Such surface coverages are in reasonable agreement with results obtained for Pt SD on gold electrodes (Bakos, S. Szabó and T. Pajkossy, Journal of Solid State Electrochemistry, 2011, 15, 2453-2459; S. Kim, C. Jung, J. Kim, C. K. Rhee, S.-M. Choi and T.-H. Lim, *Langmuir*, 2010, 26, 4497-4505). Cyclic voltammetry curves recorded for 500 nm palladium before and after platinization by SD method are shown on FIG. 2. Much higher current densities related to hydrogen electrosorption were observed for Pt covered electrodes. Further increase in the hydrogen sorption kinetics was achieved by subsequent platinum SD runs. Special attention has been focused on eliminating the oxidation of hydrogen dissolved in the solution, the working electrode was washed with the stream of argon continuously passing through the solution near the electrode. For platinum covered electrodes, the oxide reduction peak is shifted toward more positive potentials to the same position as for the platinum electrode. The oxidation/reduction charges before and after platinization were virtually identical (see inset on FIG. 3A). These results point out the high platinum surface coverage and the lack of the real surface area expansion after first Pt monolayer deposition. These observations imply that the hydrogen insertion occurs through the Pt layer rather than by hydrogen spill-over mechanism.

Figure 2:
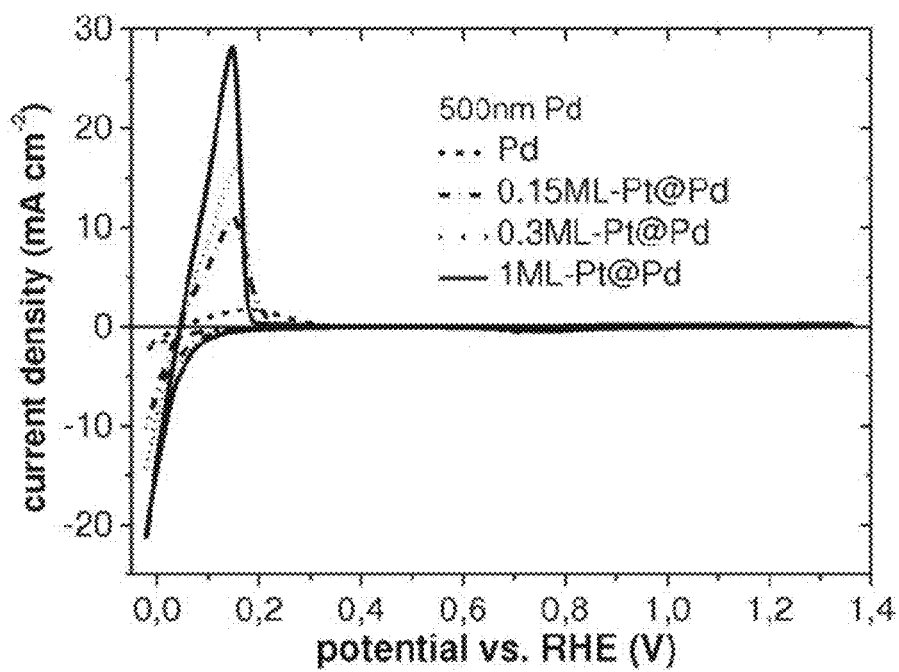
FIG. 2 presents cyclic voltammograms recorded for Pd 500 nm electrode and Pd 500 nm electrode with different platinum coverages (i.e. the Pd/Pt system of the invention) in pure 0.1 M $HClO_4$, scan rate 100 $mV \times s^{-1}$.
Figure 3A:
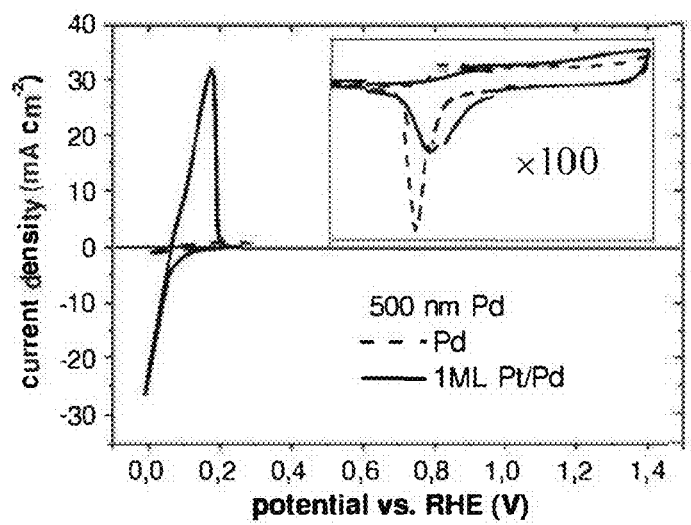
FIG. 3A presents cyclic voltammograms for 500 nm Pd before and after Pt deposition, $v=20$ $mV \times s^{-1}$
Figure 4A:
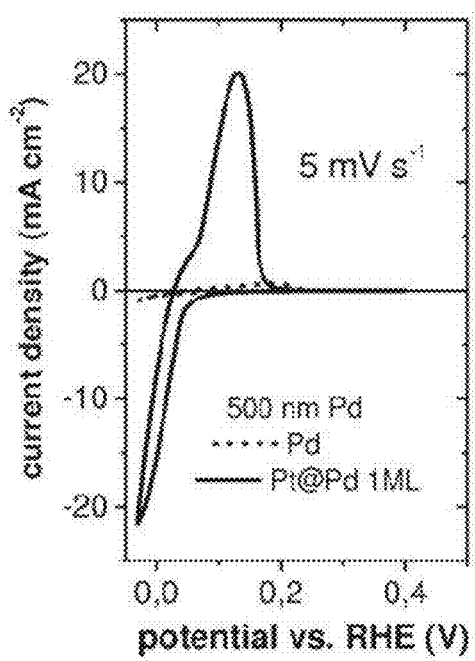
FIG. 4A presents cyclic voltammograms for Pd electrodes recorded for 500 nm Pd before and after Pt deposition, $v=5$ $mV \cdot s^{-1}$.
Figure 4B:
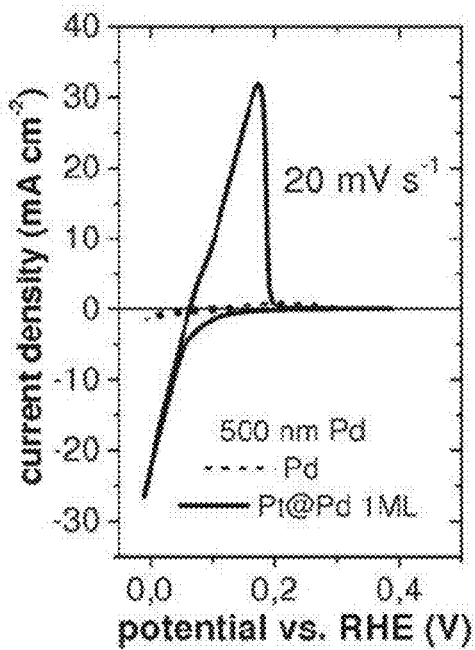
FIG. 4B presents cyclic voltammograms for Pd electrodes recorded for 500 nm Pd before and after Pt deposition $v=20$ $mV \cdot s^{-1}$.

FIG. 3A shows comparison between cyclic voltammograms recorded at 20 mV×s$^{-1}$ for pure 500 nm Pd electrode and the same electrode covered by 1ML Pt deposit obtained by Cu-UPD method. It can be observed that the currents related to hydrogen absorption/desorption are significantly higher for electrodes with platinum layer obtained by Cu galvanic displacement. This observation holds with respect to both pure palladium (FIG. 3A) and platinized Pd samples obtained by SD (FIG. 2). The maximum desorption current for 1ML-Pt/Pd is constant for scan rates higher than 20 mV×s$^{-1}$, and approaches 30 mA×cm$^{-2}$ (see FIG. 4). This is most likely related to a to ß phase transition kinetics. Special attention has been focused on eliminating the oxidation of hydrogen dissolved in the solution. The working electrode was washed with the stream of argon continuously passing through the solution near the electrode. For platinum covered electrodes, the oxide reduction peak is shifted toward more positive potentials to the same position as observed for the platinum electrode (data not shown). The oxidation/reduction charges before and after platinization were virtually identical (see inset in FIG. 3A). These results confirm the high platinum surface coverage and lack of the real surface area expansion after deposition of the first Pt monolayer. These observations imply that the hydrogen insertion occurs through the Pt layer rather than by hydrogen spill-over mechanism.

Figure 3B:
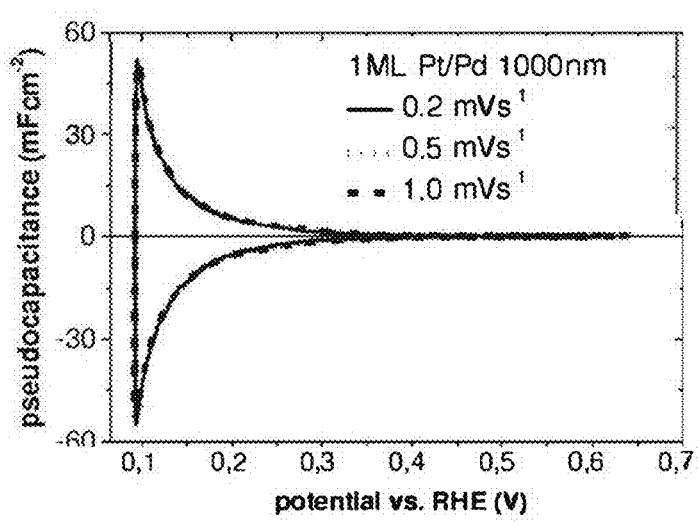
FIG. 3B presents cyclic voltammetry currents expressed as pseudocapacitances j/v for 1000 nm Pd electrode, scan rates 1.0, 0.5 and 0.2 $mV \cdot s^{-1}$
Figure 5A:
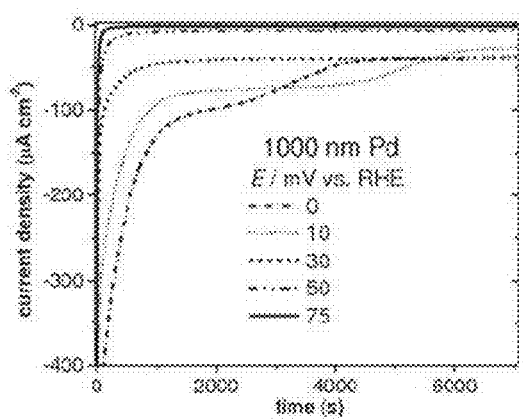
FIG. 5A presents potentiostatic absorption currents for 1000 nm palladium
Figure 5B:
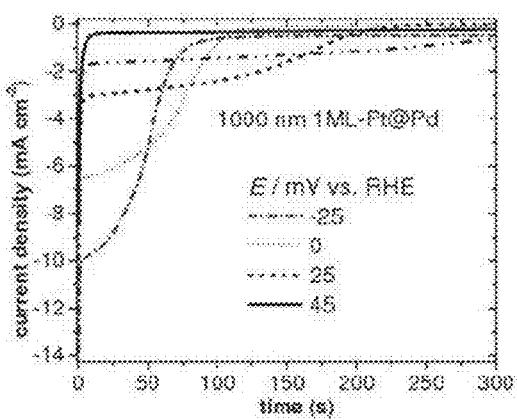
FIG. 5B presents potentiostatic absorption currents for 1000 nm palladium covered by platinum monolayer 1ML-Pt@Pd.
Figure 6:
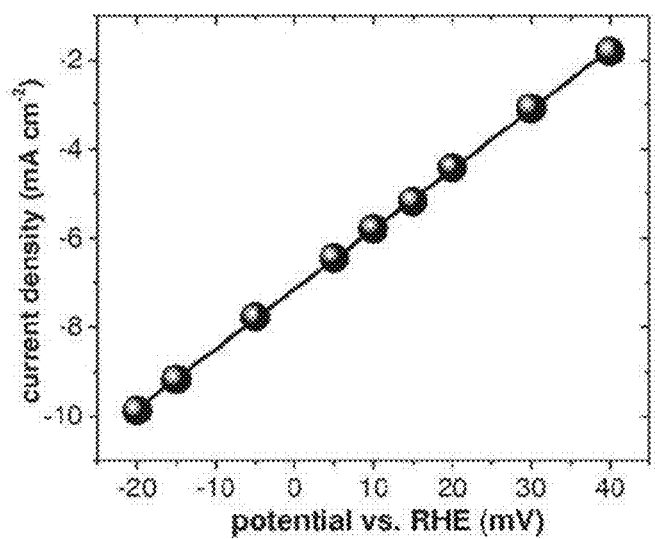
FIG. 6 presents linear dependence of the initial absorption currents for 1ML Pt@1000 nm Pd in function of the electrode potential. The slope $dI/dE=7.40$ $\Omega \cdot cm^2$ is in agreement with the solution resistance determined in EIS measurements (6.5 (2 $\Omega \cdot cm^2$).
Figure 7A:
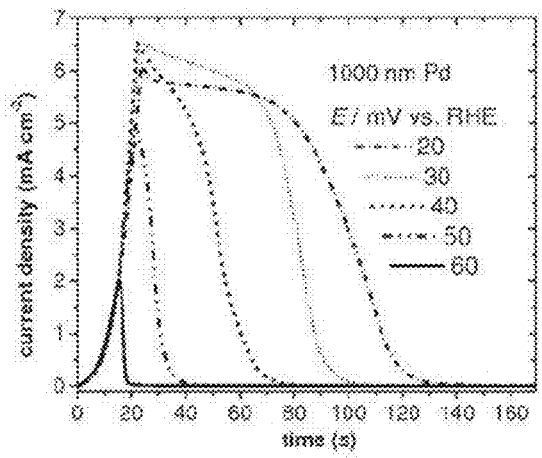
FIGS. 7A and 7B present desorption currents registered after electrode saturation at different potentials (indicated in the Figure) for 1000 nm palladium layer (FIG. 7A) and the same electrode covered by platinum monolayer (FIG. 7B).
Figure 7B:
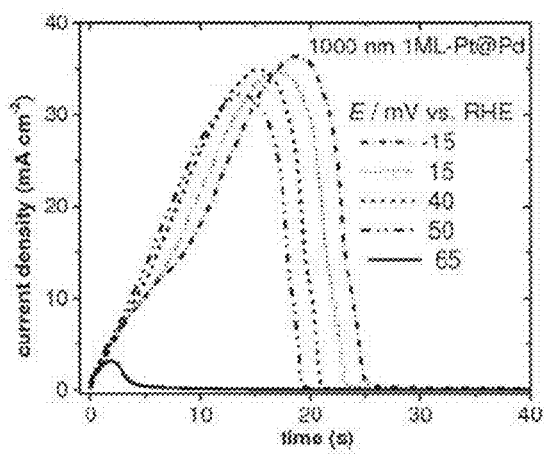
Figure 9:
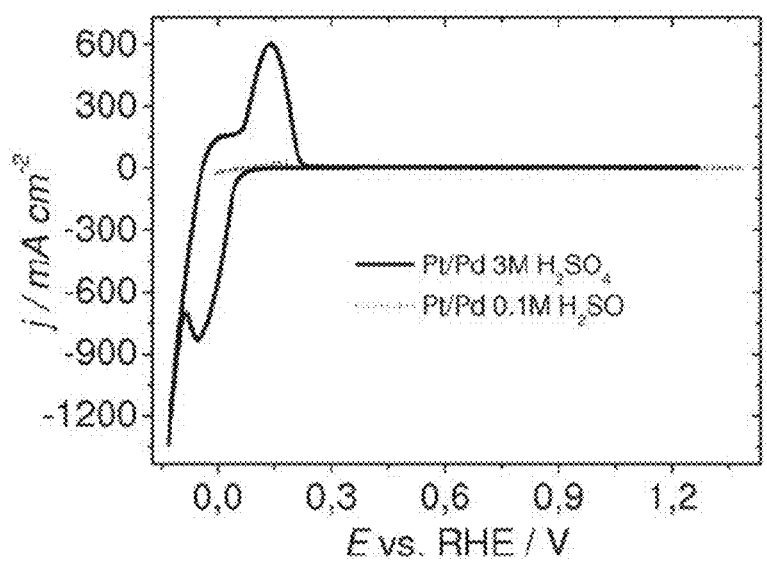
FIG. 9 Cyclic voltammograms for Pd electrodes recorded for 1000 nm Pd covered by two Pt monolayers in 3M $H_2SO_4$, $v=100$ $mV \cdot s^{-1}$, $R_f=4$

Moreover, in comparison to pure palladium, markedly enhanced hydrogen absorption kinetics has been observed for up to 10ML of Pt (thicker deposit were not prepared). However, higher oxide charges $Q_{MO}$ observed for these layers indicate a significant real surface expansion after Pt deposition. This effect suggests that after deposition of 2-nd layer further Pt deposition is not epitaxial but rather Pt islands grow in a 3D fashion. The highest absorption/desorption kinetics was observed for 3 ML-Pt/Pd and the roughness factor for this layer was estimated to be $R_f \sim 2$. In the alpha phase the cyclic voltammetry currents are symmetrical for platinized Pd electrodes. For low scan rates, currents expressed as pseudocapacitances (j/v) perfectly overlap even for relatively thick films (FIG. 3B). This clearly indicates that Pd—H system attains equilibrium at potentiodynamic conditions. It is important to stress that the hydrogen evolution reaction does not take place in this potential region (down to +0.1 mV). This implies that unusually fast hydrogen sorption kinetics is not the result of the hydrogen evolution at Pt surface. The chronoamperometric courses recorded during electrode equilibration at different potentials for both pure Pd and Pt covered electrodes are shown on FIG. 5. Depending on the electrode potential, after hydrogen saturation, the current tends either to zero or to a constant value, related to hydrogen evolution reaction. Much faster hydrogen insertion can be observed for the electrode covered with Pt monolayer. In this case, the hydrogen absorption is also related to much higher current densities. Interestingly, the limiting currents of hydrogen absorption in platinum covered electrodes are in a linear dependence with the equilibration potential (FIG. 6). The slope of this dependence dE/dI=7.4 Ω×cm$^{-2}$ coincides with the solution resistance $R_s$=6.5 Ω×cm$^{-2}$, determined in Electrochemical Impedance Spectroscopy (EIS) measurements. This result indicates that the hydrogen absorption current is limited by solution conductivity. This result indicates that the hydrogen absorption current is limited by solution conductivity in 0.1M $H_2SO_4$. In order to confirm this finding we have recorded cyclic voltammograms in 3 M sulphuric acid (FIG. 9). Indeed, in this solution hydrogen insertion is extremely increased, so that a distinct cathodic peak is formed due to hydrogen absorption for 1000 nm thick Pd electrode. This result indicates that hydrogen absorption is faster than hydrogen evolution at Pt covered Pd electrodes. After electrode equilibration, the electrode potential was scanned to 0.5 V vs. RHE at 10 mV×s$^{-1}$ and held at this potential until the current approaches zero. The results of such hydrogen desorption in function of equilibrium potential are shown on FIG. 7 for both pure Pd and Pt covered electrodes. Again, hydrogen desorption is markedly faster for the latter. It is interesting to compare conditioning times, $t_{abs}$, needed to fully saturate the Pd layer with hydrogen for both pure Pd and platinized electrodes. It is well known that the largest times, $t_{abs}$, are needed at potentials close to the phase transition region, at which the kinetics is limited by both surface and bulk phenomena (slow α/β phase transition, W. S. Zhang and X. W. Zhang, *Journal of Electroanalytical Chemistry*, 1998, 445, 55-62; W. S. Zhang, X. W. Zhang and X. G. Zhao, *Journal of Electroanalytical Chemistry*, 1998, 458, 107-112).

Figure 8A:
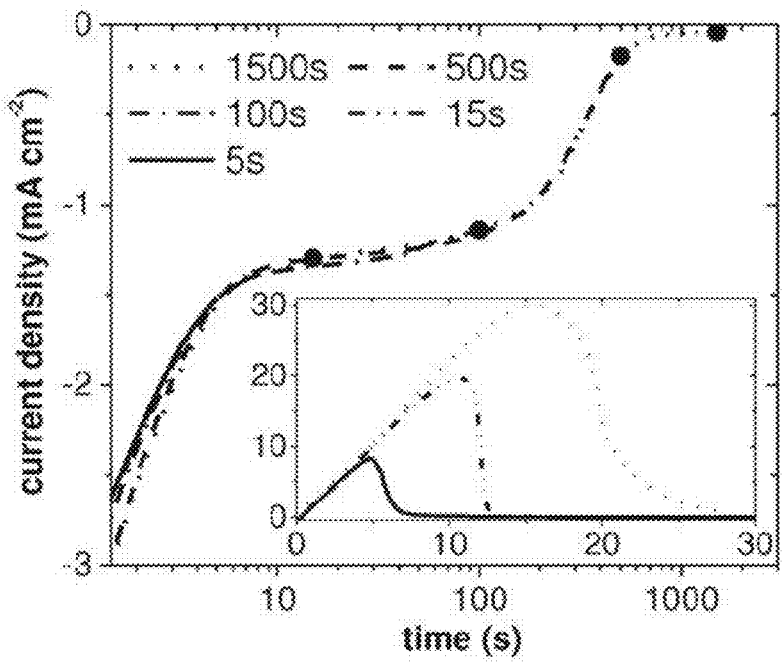
FIG. 8A presents chronoamperometric experiments at $E=0.040$ V vs. RHE performed for different times, $t_{abs}$ (indicated in the Figure), the inset shows related current desorption curves.

On FIG. 8A the results of chronoamperometric experiments performed at E=0.04 V vs. RHE (phase transition region) for different times $t_{abs}$ are shown. It is important to note that all curves recorded for shorter times perfectly overlap with the longest one, i.e. recorded for $t_{abs}$=1500s. This points out the unusual stability of the Pt monolayer on Pd substrate. The inset to FIG. 8A shows hydrogen desorption curves, recorded after saturation at given $t_{abs}$. By integration of desorption currents, one may obtain the charge related to hydrogen absorption and therefore the hydrogen concentration within Pd layer (F. Vigier, R. Jurczakowski and A. Lasia, *Journal of Electroanalytical Chemistry*, 2006, 588, 32-43; M. Slojewski, J. Kowalska and R. Jurczakowski, *Journal of Physical Chemistry C*, 2009, 113, 3707-3712).

Figure 8B:
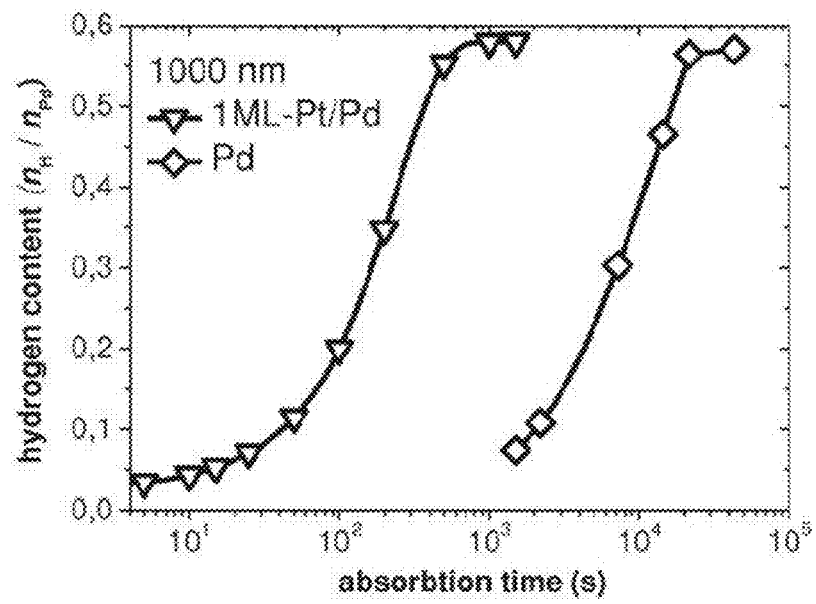
FIG. 8B presents hydrogen concentration in 1000 nm Pd and 1ML Pt/Pd expressed as molar ratio $n_H/n_{Pd}$ in function of equilibration time $t_{abs}$.

On FIG. 8B the hydrogen concentration in function of the conditioning time, $t_{abs}$, at potential within the phase transition region, $E_{abs}$=0.04V, is presented. It can be seen that the same amounts of hydrogen are inserted at times, $t_{abs}$, shorter nearly by two orders of magnitude for platinized samples. For other potentials, i.e. before and after phase transition region, we have observed similar enhancement in the hydrogen insertion rate (10-80×) for Pt covered electrodes. However, at significantly shorter time scales (see FIGS. 5 and 6).

Figure 10A:
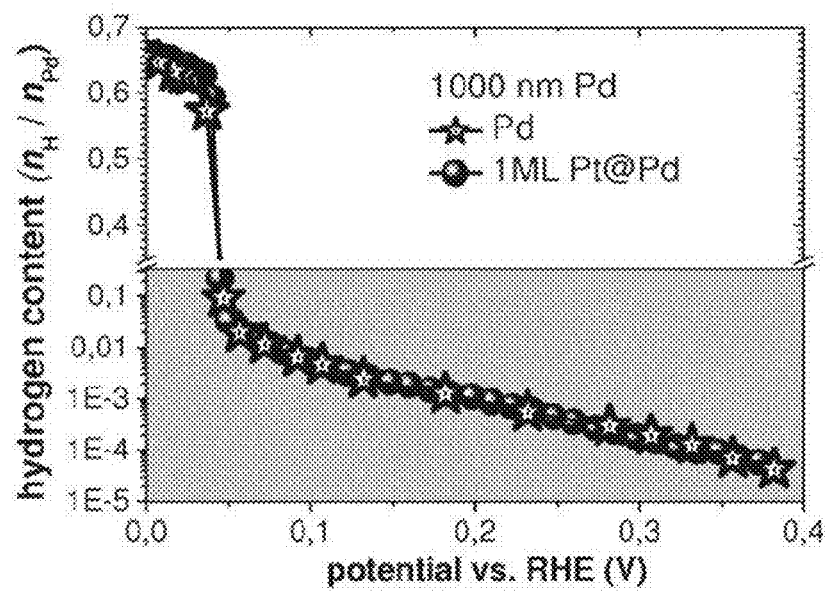
FIG. 10A presents hydrogen absorption isotherms in pure Pd and 1ML Pt/Pd.

The hydrogen absorption isotherms for pure and platinized palladium layers, determined by this approach are displayed on FIG. 10A, where low concentration range is plotted in the log scale. Both isotherms, i.e. for pure and platinized Pd largely overlap. Only the sharper phase transition region and slightly larger hydrogen concentrations in the beta phase can be observed for 1ML Pt-covered Pd electrode. These differences can be explained by kinetic hindrance for Pd pure electrode. At the FIG. 8B for pure Pd a slight but distinct increase in hydrogen concentration between 8 and 16 hours of hydrogen saturation at potential 40 mV vs. RHE is shown. The full saturation is observed after about 50 h of conditioning time.

Figure 10B:
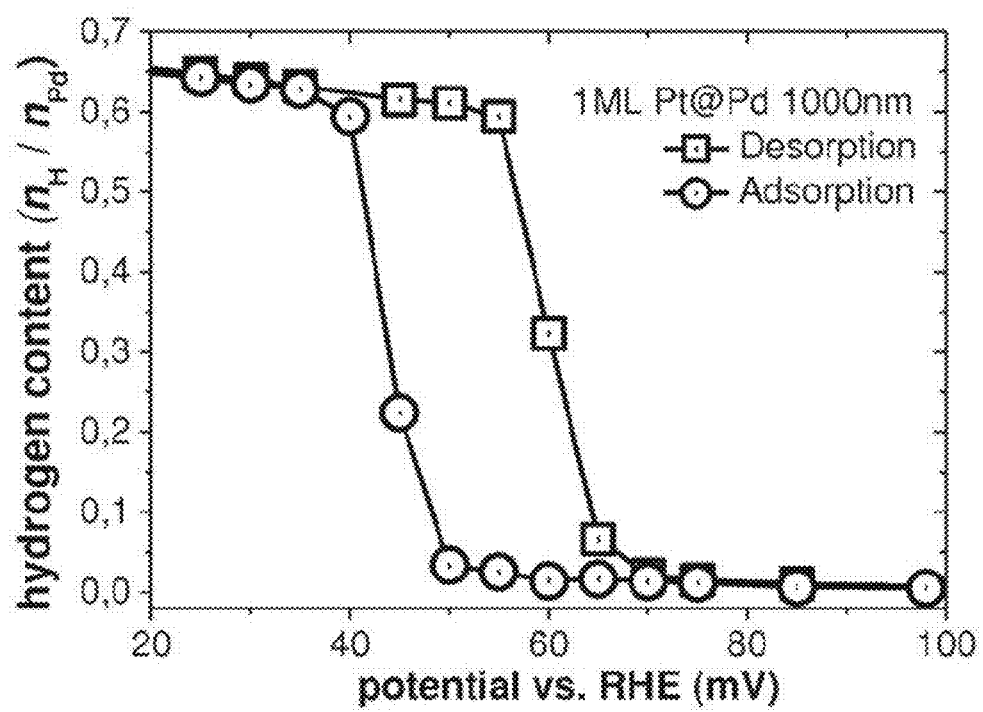
FIG. 10B presents hysteresis in the hydrogen absorption/desorption recorded for 1000 nm Pd, $v=100$ $mV \cdot s^{-1}$.

The hysteresis in the hydrogen absorption/desorption was recorded for 1000 nm Pd (results are shown on FIG. 10B). Both, the hysteresis width and its position on the potential scale, are in perfect agreement with hysteresis determined in electrochemical conditions for pure Pd (L. Birry and A. Lasia, *Electrochimica Acta*, 2006, 51, 3356-3364).

Figure 10C:
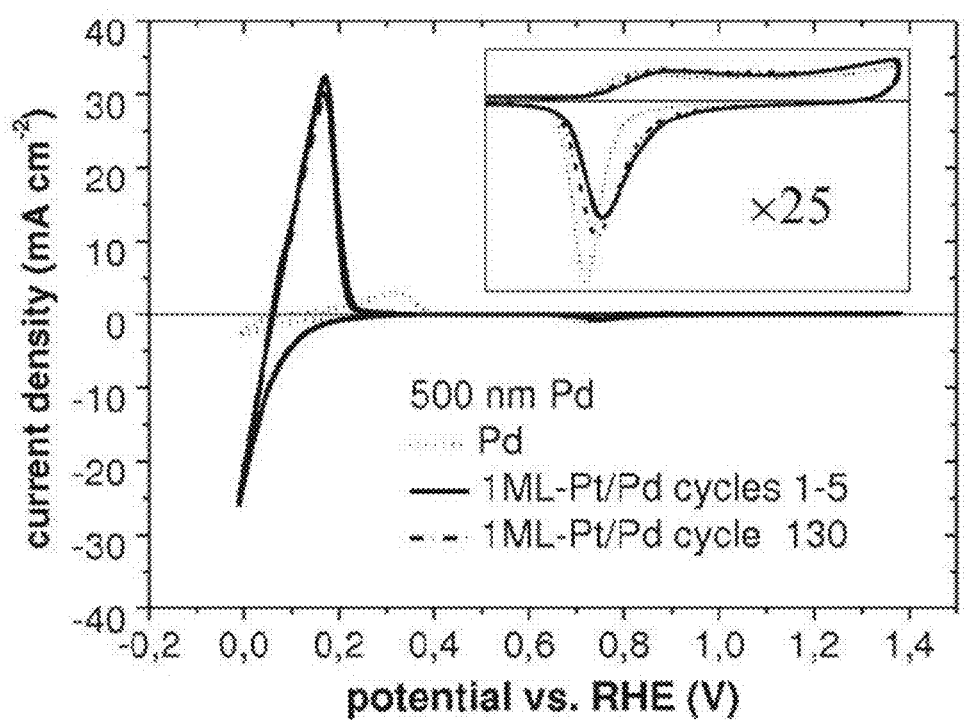
FIG. 10C presents cyclic voltammograms for Pd electrodes recorded for 500 nm Pd before and after Pt deposition, $v=100$ $mV \cdot s^{-1}$.

On FIG. 10C comparison between cyclic voltammograms recorded at 100 mV×s$^{-1}$ for 500 nm Pd electrode with and without 1ML Pt deposit is shown. For platinized sample, voltammograms were recorded before (five first cycles are shown—solid line) and after (dotted line) series of electrochemical measurements consisting on multiple hydrogen saturation/desorption runs recorded for 30 different potentials ranging from 0.37 down to 0 V. Between measurements the sample was cycled in potential region −0.01÷1.40V (over 100 cycles from hydrogen evolution to full oxides coverage). After this quite severe electrochemical treatment the Pt surface coverage is diminished only by circa 15%, and still surface coverage of 0.85 ML-Pt/Pd can be deduced from the position of the surface oxides reduction peak. This result demonstrates the apparent stability of the Pt monolayer against the hydrogen induced lattice migration (HILM) phenomena.

It is particularly interesting to compare results of electrochemical impedance spectroscopy for bare and platinized Pd films. Typical Nyquist plots are shown on FIG. 11. For palladium electrode, the coupling between double layer capacity and the resistance of the charge transfer results in a semicircle followed by a capacitive line at low frequencies, related to hydrogen electrosorption pseudocapacitance. The spectrum can be fitted to the equivalent circuit shown in inset (FIG. 11A).

For platinized electrodes the resistance of the charge transfer is absent, similarly as for pure platinum in the classical EIS measurements (B. Losiewicz, R. Jurczakowski and A. Lasia, *Electrochimica Acta*, 2012, 80, 292-301). Moreover, hydrogen absorption becomes diffusion controlled since a well-developed Warburg impedance is observed on the Nyquist plot. The fitting of the spectrum for 1 ML-Pt/Pd 1000 nm is shown on FIG. 11B and the equivalent circuit is shown above. In this circuit CPE represents both capacity of the double layer and electrosorption pseudocapacitance. Wo stands for Warburg impedance for hydrogen finite-length diffusion in reflective boundary. Diffusion coefficient calculated from Warburg impedance amounts to $1.8 \times 10^{-7}$ cm$^2$×s$^{-1}$ (at 0.170 V vs. RHE), thus approaching that reported for bulk palladium, and is nearly two orders of magnitude higher than diffusion coefficients reported to date for thin palladium films, that is $1.3 \times 10^{-9}$ cm$^2$×s$^{-1}$ (H. Hagi, *Mater T Jim*, 1990, 31, 954-958). The diffusion coefficients measured by present inventors for 1 ML-Pt/Pd 200 and 500 nm are $3.5 \times 10^{-8}$ cm$^2$×s$^{-1}$ and $1 \times 10^{-7}$ cm$^2$×s$^{-1}$ respectively. The apparent diffusion coefficients reported by Y. Li for 135 nm Pd is $2.95 \times 10^{-10}$ cm$^2$×s$^{-1}$. This result shows that apparent diffusion coefficients of hydrogen reported for thin palladium layers are severely underestimated as a result of the slow reaction at the interface (Y. Li and Y. T. Cheng, *Int. J. Hydrogen Energy*, 1996, 21, 281-291).

Figure 12:
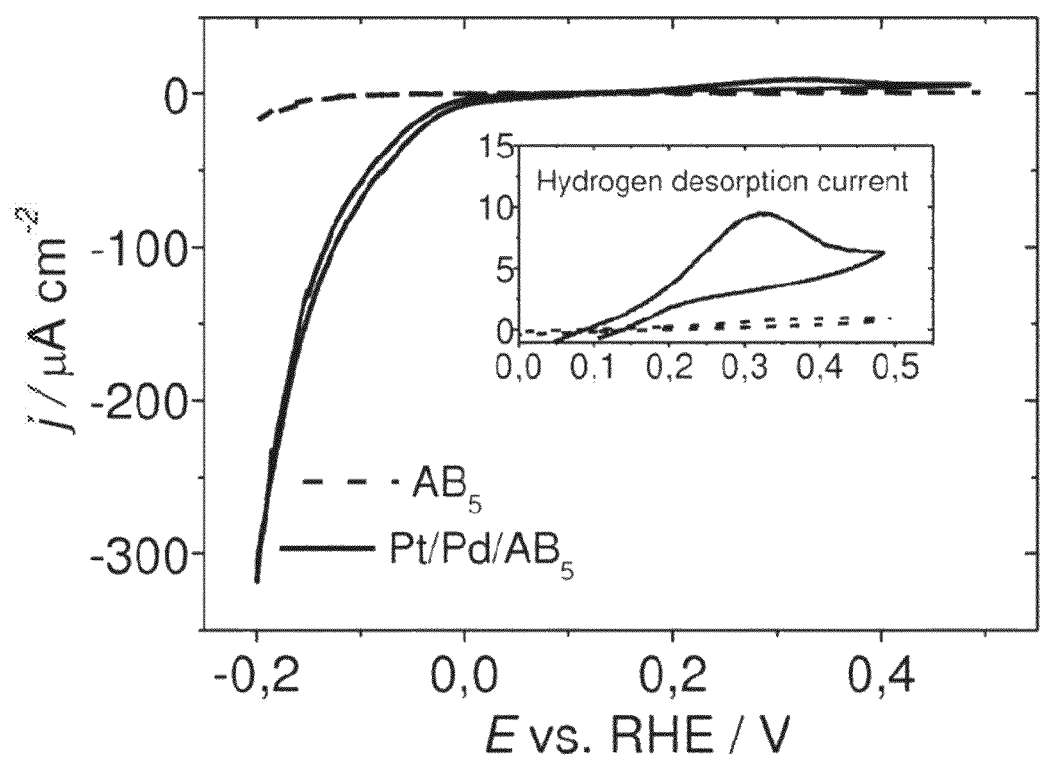
FIG. 12 presents cyclic voltammograms for AB5 (MmNi4.1Al0.2Mn0.4Co0.45) electrodes recorded before and after 1ML-Pt/1 µm-Pd deposition, $v=5$ $mV \cdot s^{-1}$.

In another embodiment of the present invention the gold substrate is replaced with inexpensive hydrogen absorbing material, namely nickel alloy storage material AB$_5$ (MmNi$_{4.1}$Al$_{0.2}$Mn$_{0.4}$Co$_{0.45}$). FIG. 12 shows comparison between cyclic voltammograms recorded at 5 mV·s$^{-1}$ for AB$_5$ electrode and the same electrode covered by 1 μm Pd obtained by electroless deposition described in [M. Słojewski et al. Phys. Chem. C, 2009, 113 (9), pp 3707-3712] and 1ML Pt deposit obtained by spontaneous deposition. It can be observed that the currents related to hydrogen absorption/desorption are significantly higher for electrodes modified with palladium-platinum system of the invention (i.e. palladium with single Pt monolayer).

CONCLUSIONS

The present inventors have investigated the hydrogen permeability through platinum monolayers deposited on palladium. The obtained results show that two-dimensional Pt deposits (1-3 monolayer in thickness) not only enable hydrogen permeation but also ultimately accelerate the hydrogen charging and discharging processes. The latter process becomes bulk diffusion limited. Moreover, diffusion coefficients of hydrogen determined for thin Pd films (200-1000 nm) covered by Pt monolayers are two orders of magnitude higher than those previously reported and determined for pure Pd thin films. An astonishing stability of platinum overlayers on Pd, after more than a hundred hydrogen absorption/desorption cycles confirms practical applications of the invention.

Pd/Pt system according to the present invention exhibits enormous enhancement in the hydrogen electrosorption kinetics and can be obtained by depositing of 1-10 platinum monolayers, preferably 1-3 monolayers, at the electrode surface. Comparable enhancement in the electrosorption kinetics cannot be achieved by any of presently known methods. At the same time, superior hydrogen capacity of palladium as well as its bulk properties remain unaffected by deposited platinum.

The approach provides insight into the process of hydrogen transport in metals-hydrogen systems. Impedance spectroscopy studies have revealed that hydrogen absorption is a diffusion controlled process at thin platinized electrodes (200-1000 nm). Pd/Pt system according to the present invention can find numerous applications in the heterogeneous catalysis, hydrogenation reactions, and hydrogen purification. Another set of industrial applications of the present invention is related to hydrogen storage or sensing systems, where fast and selective reaction in the presence of hydrogen is required.

The invention claimed is:

1. A method of increasing hydrogen absorption/desorption kinetics of a hydrogen storage material comprising palladium for reversible absorption and desorption of hydrogen, comprising the following steps:
    a) providing a palladium layer having a thickness between 50-1000 nm to obtain a palladium surface; and
    b) covering the palladium surface of the palladium layer of step a) with a platinum overlayer consisting of 1 to 10 platinum monolayers to cover the palladium layer, thus obtaining a Pd/Pt system of reversible and stable hydrogen storage material having increased absorption kinetics in comparison to the palladium surface.

2. The method of claim 1, further comprising before step a) a step of providing a palladium layer in which said palladium layer is deposited on a solid substrate.

3. The method of claim 2, wherein the platinum overlayer is a two-dimensional platinum overlayer consisting of 1 to 3 platinum monolayers.

4. The method of claim 3, wherein the platinum overlayer is a two-dimensional platinum overlayer consisting of at most two platinum monolayers.

5. The method of claim 4, wherein the platinum overlayer is a two-dimensional platinum overlayer consisting of a single platinum monolayer.

6. The method according to claim 2, wherein the substrate is a metallic substrate.

7. The method according to claim 6, wherein metallic substrate is gold substrate.

8. The method according to claim 2, wherein the substrate is AB5.

9. The method according to claim 1, wherein the increase kinetics in hydrogen absorption/desorption of hydrogen is in fuel cells or hydride batteries or supercapacitors.

10. The method of claim 1, further comprising the steps of:
    c) absorbing hydrogen in the reversible and stable hydrogen storage material obtained in step (b); and
    d) desorbing hydrogen from the reversible and stable hydrogen storage material obtained in step (b).

11. The method of claim 10, wherein steps (c) and (d) are performed repeatedly.

* * * * *